United States Patent [19]
Loeffler

[11] Patent Number: 5,799,968
[45] Date of Patent: Sep. 1, 1998

[54] BALL JOINT ASSEMBLY

[76] Inventor: Fredrick L. Loeffler, 2740 S. Canyon Trail, Hinckley, Ohio 44233

[21] Appl. No.: 393,727

[22] Filed: Feb. 24, 1995

[51] Int. Cl.$^6$ ...................................................... B60G 5/00
[52] U.S. Cl. ............................ 280/674; 280/95.1; 403/143
[58] Field of Search ................................. 280/674, 95.1, 280/96.1, 846; 403/143, 141, 122

[56] References Cited

U.S. PATENT DOCUMENTS

| | | | |
|---|---|---|---|
| 2,954,993 | 10/1960 | Scheublein, Jr. | 280/674 |
| 3,062,572 | 11/1962 | Flumerfelt | 287/90 |
| 3,113,787 | 12/1963 | Lauderdale | 280/95.1 |
| 3,483,888 | 12/1969 | Wurzel | 403/143 |
| 3,656,221 | 4/1972 | Scheublein, Jr. et al. | 29/441 |
| 3,693,999 | 9/1972 | Wood, Jr. | 280/95.1 |
| 3,711,136 | 1/1973 | Schmidt | 403/133 |
| 3,723,995 | 4/1973 | Baumann | 287/87 |
| 3,820,908 | 6/1974 | Maxeiner et al. | 403/133 |
| 3,856,423 | 12/1974 | Uchida | 403/140 |
| 3,950,006 | 4/1976 | Wood, Jr. | 403/141 |
| 3,967,907 | 7/1976 | Schmidt | 287/87 |
| 3,986,250 | 10/1976 | Beisdorf | 29/511 |
| 4,069,864 | 1/1978 | Novoryta et al. | 403/143 X |
| 4,163,617 | 8/1979 | Nemoto | 403/132 |
| 4,187,033 | 2/1980 | Zukowski | 403/137 |
| 4,203,683 | 5/1980 | Rogers | 403/132 |
| 4,231,673 | 11/1980 | Satoh et al. | 403/125 |
| 4,478,531 | 10/1984 | Levinson et al. | 403/122 |
| 4,577,988 | 3/1986 | Gollub et al. | 403/122 |
| 4,597,150 | 7/1986 | Fister et al. | 29/407 |
| 4,606,688 | 8/1986 | Schmidt | 403/140 |
| 4,639,159 | 1/1987 | Amrath | 403/50 |
| 4,704,043 | 11/1987 | Hackman | 403/143 X |
| 4,875,794 | 10/1989 | Kern, Jr. | 403/132 |
| 5,116,159 | 5/1992 | Kern, Jr. et al. | 403/132 |

FOREIGN PATENT DOCUMENTS

| | | | |
|---|---|---|---|
| 0485289 | 12/1917 | France | 403/143 |
| 0806438 | 12/1936 | France | 280/674 |
| 1575902 | 7/1969 | France | 280/674 |
| 0719047 | 3/1942 | Germany | 280/674 |
| 1808331 | 3/1990 | Germany | 280/674 |

Primary Examiner—Christopher P. Ellis
Attorney, Agent, or Firm—Fay, Sharpe, Beall, Fagan, Minnich & McKee

[57] ABSTRACT

A ball joint assembly for connecting a tie rod to a rack and pinion steering assembly includes first and second housing members selectively mated to define a cavity that receives the ball of the tie rod and a bearing. The first housing member includes a threaded portion matingly engaging a threaded portion disposed on the second housing member.

13 Claims, 2 Drawing Sheets

BALL JOINT ASSEMBLY

BACKGROUND OF THE INVENTION

The present invention relates generally to the art of tie rods. More particularly, the present invention is directed to an improved tie rod ball joint for connecting steering assemblies to the wheels.

Rack and pinion steering assemblies in automotive vehicles typically employ tie rod ball joints in order to provide a wide range of motion during wheel steering. In known structures, a housing has a cavity which receives the ball end of the tie rod. A bearing of hardened metal or synthetic plastic, also received in the cavity, provides a low friction pocket in which the ball may rotate.

The tie rods in automotive vehicles are positioned proximate to the road surface. As a result, the ball joints are exposed to dirt, gravel, grit or other foreign material from the road. Rubber bellows or boots are usually provided and designed to seal the tie rods. Foreign material, however, manages to infiltrate the ball joint area, for example if the seal fails. Continued movement of the joint causes the ball surface to be ground, scratched, or deformed when a hardened metal bearing is used. Likewise, recent tie rod assemblies employ a plastic bearing that is damaged from the exposure resulting in a loose fit which impacts on the entire steering system.

Ball joints of tie rods damaged by adverse effects of foreign material must be replaced. A specialty rebuilder replaces the damaged tie rod by cutting or severing the housing to expose the ball and bearing. Thereafter, the surface of the ball is machined to reduce the outer diameter, for example by approximately 0.02 inches, where metal bearings are used. The machining eliminates scratches, deformations, or the like caused by the foreign material and produces a ball of a slightly reduced diameter with a smooth outer surface. A new plastic bearing having a reduced pocket diameter to fit the repaired ball is secured in a new housing. If the damaged tie rod has a plastic bearing then only the bearing need be replaced, preferably with a new self-lubricating plastic bearing.

The old housing, once cut into pieces, is rendered useless and, in accordance with known repair methods, is replaced with a new housing. The new housing has a cavity adapted to receive the bearing and ball therein through a generally cylindrical opening at one end. The bearing is initially inserted through the opening into the cavity and then the ball is similarly inserted through the opening into close receiving fit in the bearing. Thereafter, the one end of the new housing is permanently deformed, through a swaging operation, to capture and retain the ball and bearing in the cavity.

Replacing the old housing, along with the labor and equipment needed to rebuild it, manufacturing a new housing, and machining a new ball add to the overall expense associated with replacing damaged tie rod ball joints. Moreover, this assembly cannot be adjusted or repaired in place on the vehicle. Again, additional labor and expense are thus associated with replacing existing tie rod ball joint assemblies, along with waste of housing portions that are otherwise in good condition since the housing must be cut open and is thereby rendered useless under existing methods of replacement.

Accordingly, a need exists for a new ball joint which overcomes the foregoing difficulties and which provides easier access to the tie rod ball and bearing for repair and adjustment purposes.

SUMMARY OF THE INVENTION

The present invention contemplates a new tie rod ball joint assembly that is designed with repair and adjustment as primary considerations.

According to one aspect of the present invention, a ball joint assembly is provided for connecting a rack and pinion steering assembly to a ball end of a tie rod. The ball joint assembly provides first and second housing members which can be remachined and reused (recycled), if not damaged. The housing members are selectively coupled and uncoupled to secure the tie rod ball received in a cavity thereof. A self-lubricating plastic bearing is preferably received in the cavity which encloses the ball of the tie rod and provides a reduced friction surface over which the ball may articulate. The first housing member has a generally cylindrical wall open at first and second ends and closely receives an outer surface of the bearing therein. An external surface of the first housing member includes a threaded portion for selectively mating with an internal threaded portion of the second housing member.

According to another aspect of the invention, the housing members can be reused or recycled since they are designed for selective opening and closing.

According to another aspect of the present invention, the first housing member further includes an inner wall portion which slopes inwardly to define a spherical portion having a reduced diameter opening less than the diameter of the ball. This conformation prevents pullout of the bearing and ball from the housing.

According to a further aspect of the present invention, the second housing member further includes a second threaded portion which engages an end of the rack.

A primary advantage of the present invention is to provide a ball joint assembly that may be easily adjusted or repaired for connecting tie rods to rack and pinion steering assemblies of automotive vehicles.

Another advantage of the invention resides in the ability to replace the bearing assembly in place on the automotive vehicle without changing front end alignment.

Still another advantage of the invention is realized by reusing the original housing of the tie rod ball joint assembly.

Yet another advantage is found in the use of a self-lubricating plastic instead of a hardened metal or standard plastic material, resulting in a tie rod having increased life just by replacing the bearing when it wears.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DESCRIPTION OF THE PREFERRED EMBODIMENT

Figure 1:
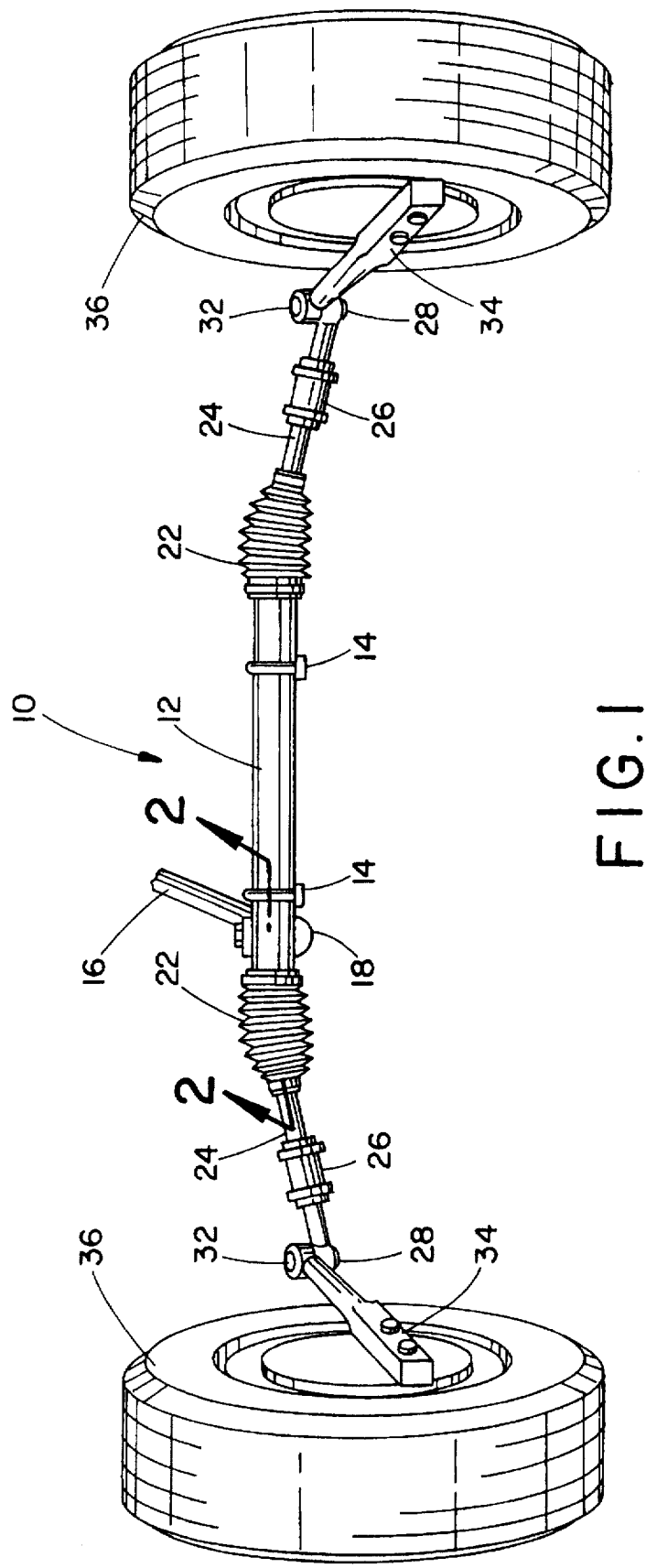
FIG. 1 is a diagrammatic isometric view of a rack and pinion steering linkage for an automotive vehicle equipped with tie rod ball joint assemblies according to the present invention.

Referring now to the drawings wherein the showings are for the purposes of illustrating the preferred embodiment of the invention only and not for purposes of limiting same. FIG. 1 shows a rack and pinion steering assembly 10 for an automotive vehicle according to the present invention. A rack and pinion housing 12 in the form of an elongated tube is mounted across the front end of an automobile by mounting brackets 14. A steering shaft or column 16 from the steering wheel (not shown) enters a pinion housing 18 near one end of the housing 12. Rubber bellows or boots 22 are secured to the ends of the housing 12 and to tie rods 24. As described above, the boots 22 limit exposure of the inner tie rods to debris from the road surface. Tie rods 24 are connected through turnbuckles 26 with the stems of outer tie rod joint housings 28 carrying studs 32 which are secured to the ends of steering arms 34 of wheels 36. The arrangement is such that longitudinal shifting of a rack bar in the housing 12 by rotation of the steering column 16 will push or pull the tie rods 24 to swing the steering arms 34 thereby causing the wheels 36 to turn. Further details of the structure and operation of the steering assembly are well known in the art so that further discussion herein is deemed unnecessary.

Figure 2:
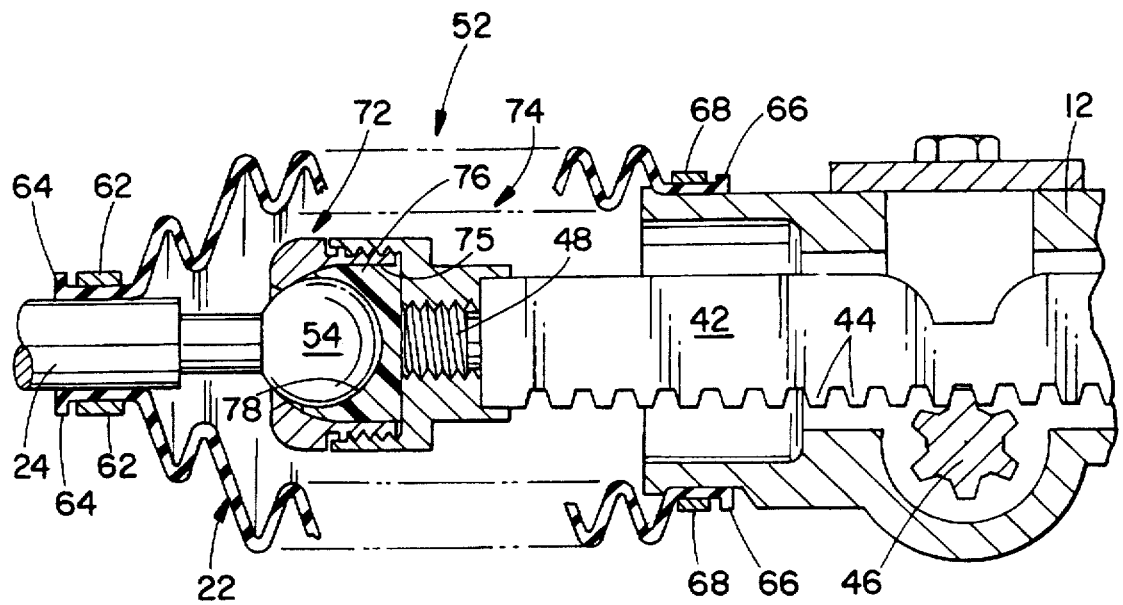
FIG. 2 is an enlarged sectional view of the linkage taken generally along the line II—II of FIG. 1.

As shown in FIG. 2, the rack and pinion steering assembly has a longitudinally shiftable rack bar 42 mounted in the housing 12 with rack teeth 44 engaged by pinion 46 which is rotated by the steering shaft. Opposite ends of the rack bar 42 project beyond the ends of the housing 12 and, as illustrated in FIG. 2, the terminal end of the rack bar 42 has a reduced diameter, externally threaded portion 48, or in other assemblies the threaded portion is a female threaded portion. Fastener 62 secures end portions 64 of the boot 22 to the tie rod 24. Likewise, second end portions 66 of the boot are secured to the housing 12 using fasteners 68.

According to the present invention, tie rods 24 are selectively connected to the ends of rack bar 42 by means of ball joint assemblies 52. With continuing reference to FIG. 2 and additional reference to FIG. 3, the ball joint assembly 52 of the present invention includes a first or front housing member 72 and a second or back housing member 74 selectively mated thereto. The housing members cooperate to secure ball 54 of the tie rod 24 within cavity 75. A bearing 76 is also retained within the mated housing members and substantially encloses the ball 54. Specifically, the bearing has an inner surface 78 having a low coefficient of friction, over which the ball may articulate. Preferably, the bearing 76 is formed from a synthetic self-lubricating plastic, while the front and back housing members are formed from a metallic material exhibiting rigid characteristics. The bearing inner surface closely conforms to the external surface of the ball and preferably covers more than one-half the surface area of the ball, and preferably covers approximately ninety percent of the ball surface area.

Figure 3:
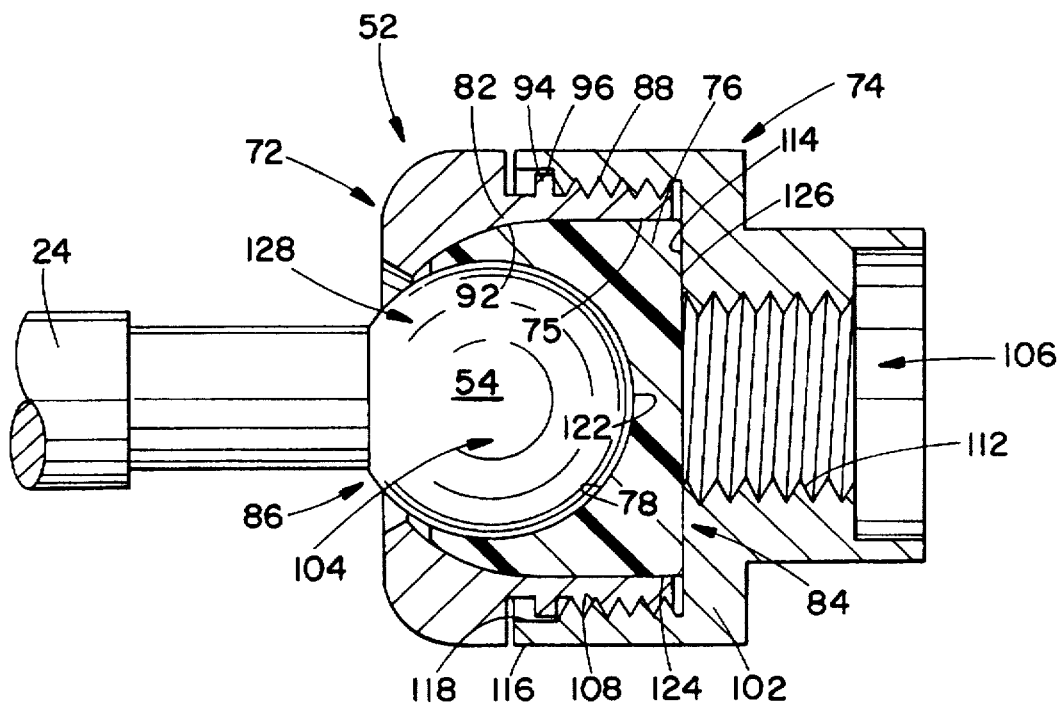
FIG. 3 is an enlarged elevational view with selected parts in cross section particularly illustrating the ball joint assembly of the present invention.

As shown in greater detail in FIG. 3, housing member 72 has a generally cylindrical wall 82 extending between first and second ends having different diameter openings 84, 86, respectively. The wall 82 has an outer threaded portion 88 disposed adjacent the first open end 84. Threaded portion 88 provides the means by which the front housing member is selectively mated into the back housing member. The wall 82 further includes an inner surface portion 92 sloping inwardly as it extends from the large diameter opening 84 to the smaller diameter opening 86. Since opening 86 is smaller than the diameter of the ball, it provides an abutment for restraining axial movement of the bearing 76 and ball. A circumferentially continuous bead or flange 94 is disposed on the outer surface of the wall 82 and positioned inwardly adjacent the threaded portion 88. The bead extends radially outward and contains an outwardly facing surface 96 for reasons which will become more apparent below.

The second or back housing member 74 has a generally cylindrical wall 102 extending between first and second open ends 104 and 106, respectively. An inner surface of the wall includes a female threaded portion 108 disposed adjacent the first open end 104 which selectively mates with the male threads 88 of the first housing member. Threaded bore 112 communicates between the housing cavity 75 and open end 106. The threads selectively connect the housing to the threaded portion 48 (FIG. 2) of the rack. Of course, other rack connecting arrangements can be used without departing from the overall scope and intent of the subject invention.

Shoulder 114 extends radially inward between the threaded portion 108 and the bore 112. The shoulder provides an abutment surface to preclude axial movement of the bearing member 76 in the cavity. A collar 116 is disposed adjacent the first open end 104 and extends axially outward from the end of the cylindrical wall 102. This collar 116 has a radially inwardly facing surface 118 which overlaps the bead surface 96. If desired, the collar may be peened or deformed inwardly over flange 94. This deformation, however, may be easily reversed by using a screwdriver or other tool and deflecting the collar outwardly again. This is contrasted to the swaging operation in prior art housings which is not a reversible procedure since the housing is cut into pieces to access the internal cavity.

The front housing member 72 is configured to easily detach from the back housing 74 member and provide access to ball of the tie rod and bearing 76. To detach the housing members, the front housing member is rotated relative to the back housing member until threaded portions 88 and 108 separate from each other. The ball and bearing may then be removed from the cavity. If the tie rod joint has a plastic bearing, only the bearing is worn and requires replacement. In models having a hardened metal bearing, the external surface of the ball is machined to a smaller diameter thereby removing surface areas damaged by the grinding of foreign material between the ball and bearing. A new bearing with a similarly reduced inner surface is also provided and the used bearing may be disposed. Preferably, the new bearing is formed from self-lubricating plastic for all the reasons noted above. The reconditioned ball and new bearing are then placed in the housing members and the front and back housing members threaded together to secure the tie rod to the rack and pinion assembly.

The present invention provides a joint assembly having front and back housing members selectively mated to secure the ball of a tie rod to the rack and pinion assembly. The present invention allows for the replacing of worn plastic bearings of aged ball joints due to normal wear without the need for replacing the housing elements. Moreover, the selectively mating arrangement between the front and back housing elements allows the tie rod and rack to be altered longitudinally without having to replace the housing elements.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A repairable tie rod ball joint assembly comprising:

a first housing member has a wall extending between first and second open ends, the wall includes an externally threaded portion disposed adjacent the first open end; and a second housing member has a wall extending between first and second ends, the wall includes a first internal threaded portion disposed adjacent the first end which selectively mates with the threaded portion of the first housing member to form a cavity configured to secure a ball of a tie rod therein, and a second threaded portion disposed adjacent the second end for selectively connecting the second housing member to an end of a rack of a rack and pinion steering assembly.

2. The assembly of claim 1 further comprising a bearing interposed between the ball and the mated first and second housing members, the bearing having an arcuate inner surface for slideably engaging an outer spherical surface of the ball.

3. The joint assembly of claim 2 wherein the bearing arcuate inner surface defines a generally hemispherical cavity with an opening coaxially aligned with the second open end of the first housing member through which the tie rod extends.

4. The ball joint assembly of claim 1 wherein the first open end of the first housing member is coaxially aligned with and received in the first end of the second housing member.

5. The ball joint assembly of claim 2 wherein the bearing is formed from a self-lubricating plastic having a low coefficient of friction.

6. The ball joint assembly of claim 2 wherein the first housing member further includes a wall portion sloping radially inward and axially away from the second housing member to provide an abutment for restraining axial movement of the bearing and ball.

7. The ball joint assembly of claim 1 wherein the first housing member further includes a bead circumferentially disposed on the outer surface between the threaded portion and the second open end, the bead extending radially outward and the second housing member further includes a collar disposed adjacent the first end and extending axially outward from an end of the cylindrical wall.

8. The ball joint assembly of claim 7 wherein the collar is deformable over the bead to form a mechanical lock.

9. A ball joint assembly for selectively connecting a rack and pinion steering assembly to a tie rod, the ball joint assembly comprising:

a ball integrally connected to the tie rod, the ball having a smooth outer spherical surface;

a bearing substantially enclosing the ball of the tie rod, the bearing having a generally hemispherically shaped inner surface slidably engaging the outer surface of the ball end;

a metallic first housing member having a wall extending between first and second open ends, the wall having a threaded portion disposed adjacent the first open end; and a metallic second housing member having a wall extending between first and second open ends, the wall having a threaded portion disposed adjacent the first end which selectively mates with the threaded wall outer surface portion of the first housing member to form a cavity which retains the bearing and ball and a second threaded portion disposed adjacent the second end for selectively connecting the second housing member to an end of the rack of said rack and pinion steering assembly.

10. The ball joint assembly of claim 9 wherein the bearing has a generally outer cylindrical surface abuttingly engaging an inner surface of the wall of the first housing member to restrain radial movement of the bearing within the cavity.

11. The ball joint assembly of claim 9 wherein the first open end of the first housing member is coaxially aligned with and received in the first open end of the second housing member.

12. The ball joint assembly of claim 9 wherein the bearing further includes an opening coaxially aligned with the second open end of the first housing member through which the tie rod extends.

13. A repairable tie rod ball joint assembly consisting essentially of:

a first housing member has a wall extending between first and second open ends, the wall includes an externally threaded portion disposed adjacent the first open end; and a second housing member has a wall extending between first and second ends, the wall includes a first internal threaded portion disposed adjacent the first end which selectively mates with the threaded portion of the first housing member to form a cavity configured to secure a ball of a tie rod therein, and a second threaded portion disposed adjacent the second end for selectively connecting the second housing member to an end of a rack of a rack and pinion steering assembly.

* * * * *